(No Model.)
J. B. NEFF.
WHEEL.
No. 293,498. Patented Feb. 12, 1884.
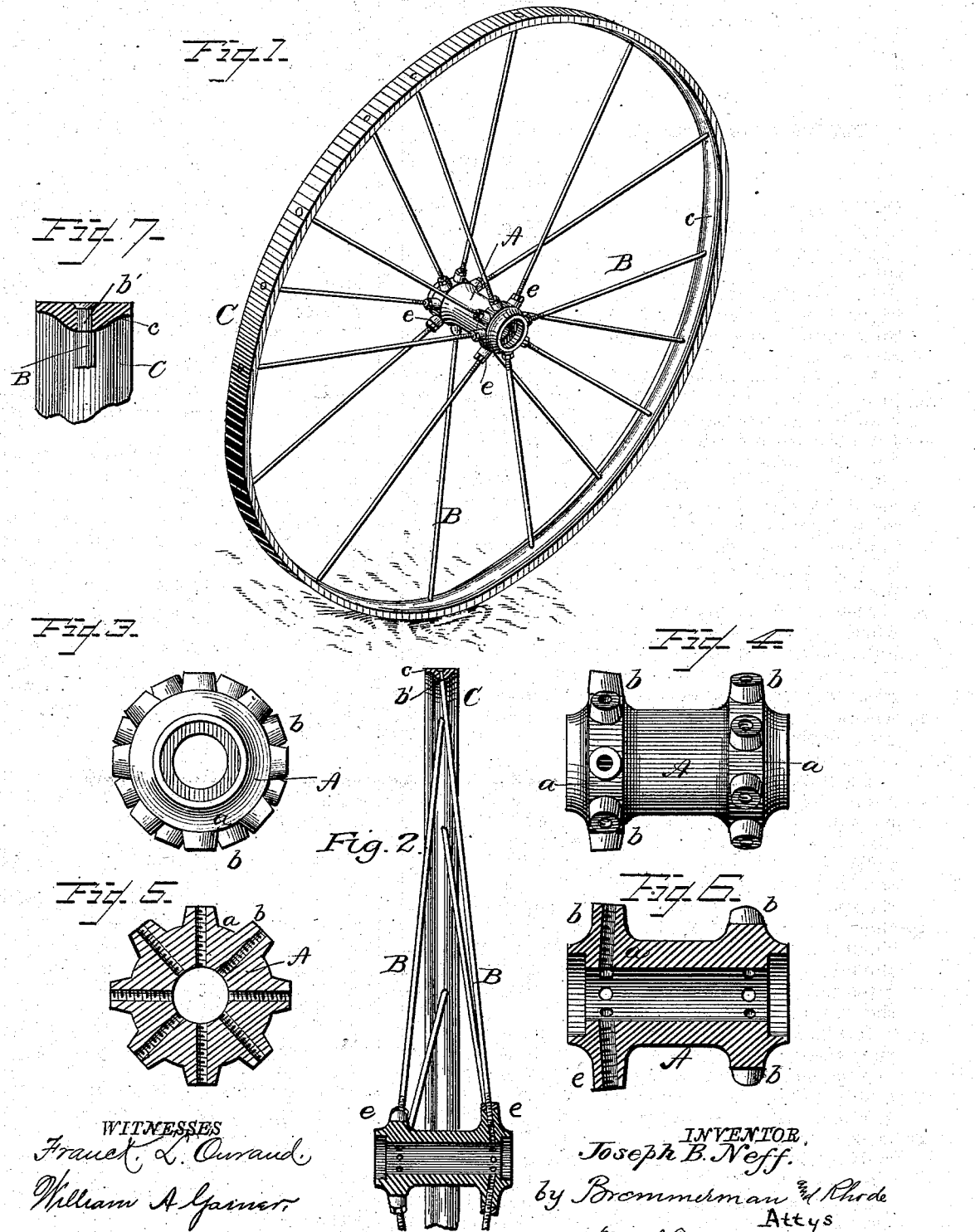

UNITED STATES PATENT OFFICE.

JOSEPH B. NEFF, OF BURLINGTON, IOWA.

WHEEL.

SPECIFICATION forming part of Letters Patent No. 293,498, dated February 12, 1884.

Application filed June 4, 1883. (No model.)

*To all whom it may concern:*

Be it known that I, JOSEPH B. NEFF, a citizen of the United States of America, residing at Burlington, Des Moines county, Iowa, have invented a new and useful Improvement in Wheels for Plows and Agricultural Implements, of which the following is a specification.

Figure 1 is a perspective view of my improved metal wheel. Fig. 2 is a sectional view in detail, of parts of my wheel. Figs. 3, 4, 5, and 6 are different views of the hub. Fig. 7 is a sectional view of the rim.

The object of this invention is to improve metal wheels which are especially designed for sulky-plows and other agricultural wheel implements, which are necessarily subjected to very tough usage in moving over rough plowed land.

The nature of my invention consists in a wheel which is made entirely of metal, the hub, spokes, and rim of which are constructed and so united that while the wheel possesses great strength it is very light and durable, as will be understood from the following description, when taken in connection with the annexed drawings.

The hub A is made of one piece, having annular thickened portions or belts $a\ a$ near its ends, and radial nipples $b$ arranged at regular distances apart. These nipples are provided with female screw-threads adapted to receive the male screw-threaded inner ends of the spokes. The spokes B are of metal, and their inner ends are screwed into the hub. Their outer ends are reduced, so as to form shoulders $b'$, and the reduced portions are fitted into holes made through the rim C of the wheel and riveted in the said rim.

It will be observed that the shape of the rim, when taken in cross-section, is that of a double ogee—that is to say, the rim is considerably thickened at the middle of its width at $c$, and thin at its edges. This gives a sufficient body of metal to firmly hold the outer ends of the spokes, and allow them to be riveted. At the same time I have a rim which is very strong and light. It will be seen that I have a comparatively long hub, and that the spokes incline toward the rim C; or, in other words, the wheel has "staggered" spokes, which serve as lateral braces in two directions, to prevent the wheel from being dished when subjected to undue side strain.

The manner of putting the several parts of the wheel together is as follows: The spokes B are provided with jam-nuts $e$, which are applied on their screw-threaded ends. These ends are then screwed into the hub until the rim C will pass around the tenoned ends of the spokes. The latter are then turned backward until the shoulders of the tenoned ends abut forcibly against the rim. The jam-nuts $e$ are then screwed up hard against the ends of the nipples of the hub, after which the outer ends of the spokes are riveted fast to the rim.

I am aware that it is not new to make staggered-spoke wheels of metal—the spokes secured into the hub; also, that it is not new to secure metal spokes to metal wheel-hubs by nuts; also, that it is not new to tenon the ends of spokes into the rim of a metal wheel; also, that it is not new to employ angle-iron rims for wheels. These features will be found, when separately considered, in several patented wheels, and are not claimed, except when constructed and combined as I have described and shown.

I am also aware that a metal hub has been made having circular ribs at its ends, into which spokes are screwed.

Having described my invention, what I claim as new, and desire to secure by Letters Patent, is—

As a new and improved article of manufacture, a wheel composed entirely of metal, consisting, first, of a hub made of one piece having annular thickened portions, and re-enforced by nipples $b$, projecting beyond the diameter of this hub, and having inclined screw-threaded holes through them, the staggered spokes screwed into said nipples, the jam-nuts $e$ for the inner ends of the spokes, the rim C, centrally thickened to leave thin edges, and perforated, and the outer tenoned ends of the spokes passed entirely through the rim, shouldered, and riveted to this rim, all constructed in the manner shown and described.

JOSEPH B. NEFF.

Witnesses:
D. M. HAMMOCK,
S. S. TUTTLE.